(12) United States Patent
Lee et al.

(10) Patent No.: US 12,135,159 B2
(45) Date of Patent: Nov. 5, 2024

(54) METHOD FOR MANUFACTURING EVAPORATOR FOR ICE-MAKING AND EVAPORATOR FOR ICE-MAKING

(71) Applicant: Coway Co., Ltd., Gongju-si (KR)

(72) Inventors: Kwon-Jae Lee, Seoul (KR); In-Du Choi, Seoul (KR); Hyun-Woo Lee, Seoul (KR); Chung-Lae Kim, Seoul (KR); Chan-Jung Park, Seoul (KR); Woong Jung, Seoul (KR)

(73) Assignee: Coway Co., Ltd., Gongju-si (KR)

( * ) Notice: Subject to any disclaimer, the term of this patent is extended or adjusted under 35 U.S.C. 154(b) by 586 days.

(21) Appl. No.: 17/413,436

(22) PCT Filed: Dec. 11, 2019

(86) PCT No.: PCT/KR2019/017501
§ 371 (c)(1),
(2) Date: Jun. 11, 2021

(87) PCT Pub. No.: WO2020/122601
PCT Pub. Date: Jun. 18, 2020

(65) Prior Publication Data
US 2022/0057129 A1  Feb. 24, 2022

(30) Foreign Application Priority Data
Dec. 13, 2018  (KR) .......................... 10-2018-0160644

(51) Int. Cl.
*F25B 39/02* (2006.01)
*B23K 26/21* (2014.01)
(Continued)

(52) U.S. Cl.
CPC ................ *F25C 5/08* (2013.01); *B23K 26/21* (2015.10); *F25B 39/02* (2013.01); *F25C 1/08* (2013.01);
(Continued)

(58) Field of Classification Search
CPC ............... B23K 2101/14; B23K 31/027; F28F 2275/067; B21D 53/04; B21D 53/06;
(Continued)

(56) References Cited

U.S. PATENT DOCUMENTS

2015/0168074 A1* 6/2015 Bariar .................... B21D 53/06
29/890.036
2015/0170801 A1* 6/2015 Talbot .................. E21B 17/206
228/173.6

FOREIGN PATENT DOCUMENTS

JP         2008-260049 A      10/2008
KR     10-2013-0104467 A       9/2013
(Continued)

OTHER PUBLICATIONS

International Search Report issued on Mar. 19, 2020 in PCT/KR2019/017501 filed on Dec. 11, 2019, 2 pages.

*Primary Examiner* — Christopher J. Besler
(74) *Attorney, Agent, or Firm* — Oblon, McClelland, Maier & Neustadt, L.L.P.

(57) ABSTRACT

A method for manufacturing an evaporator for ice-making includes: a preparation step for preparing a plate member, a finger member, and a capillary tube, the plate member being provided with a through hole and formed as a developed view of a tube; an insertion step for inserting the finger member into the through hole so that the finger member at least partially passes through the through hole; a connection step for fixedly connecting the finger member to the plate member; an insert placement step for placing at least a part of the capillary tube on the plate member; and an evaporation tube formation step for forming an evaporation tube, which is provided with a refrigerant flow path through which a refrigerant flows, by bending the plate member into a tube shape and connecting end portions.

10 Claims, 8 Drawing Sheets

(51) Int. Cl.
*B23K 31/02* (2006.01)
*F25C 1/08* (2006.01)
*F25C 5/08* (2006.01)
*B23K 101/14* (2006.01)

(52) U.S. Cl.
CPC ........ *B23K 31/027* (2013.01); *B23K 2101/14* (2018.08); *B23P 2700/09* (2013.01)

(58) Field of Classification Search
CPC .... B21D 53/08; F25B 39/02; F25B 2339/045; B23P 2700/09; B23P 15/26
See application file for complete search history.

(56) References Cited

FOREIGN PATENT DOCUMENTS

| | | |
|---|---|---|
| KR | 10-2018-0009521 A | 1/2018 |
| KR | 10-1871741 B1 | 6/2018 |
| KR | 10-1887881 B1 | 8/2018 |
| KR | 10-1893533 B1 | 8/2018 |
| KR | 10-2018-0128698 A | 12/2018 |

* cited by examiner

METHOD FOR MANUFACTURING EVAPORATOR FOR ICE-MAKING AND EVAPORATOR FOR ICE-MAKING

TECHNICAL FIELD

The present disclosure relates to a method for manufacturing an evaporator for ice-making and an evaporator for ice-making.

BACKGROUND ART

An evaporator for ice-making is used for ice making and may include an evaporation tube, in which a refrigerant flows, and a finger member connected to the evaporation tube.

In the case in which an evaporator for ice-making includes an evaporation tube and a finger member, when a refrigerant having a temperature lower than freezing point is allowed to flow while the finger member is immersed in water contained in a water tray or water is sprayed onto the finger member, ice may be made on the finger member.

To manufacture such an evaporator for ice-making, in the related art, an evaporation tube and a finger member were manufactured and then a portion of the evaporation tube was pressed to be flat, and thus, a flat connection surface was formed on the evaporation tube. Then, a plurality of through-holes were formed in the connection surface of the evaporation tube, and a connection projection was formed on an external circumferential surface of each of the plurality of through-holes by a burring process. An upper end portion of the finger member was fitted into the through-hole, and then a laser was irradiated to the connection projection of the evaporation tube to weld the upper end portion of the finger member to the connection projection of the evaporation tube, so that the finger member was fixedly connected to the connection tube.

As described above, in the related art, the laser was irradiated to the connection projection of the evaporation tube to weld the upper end portion of the finger member to the connection projection of the evaporation tube, so that the finger member was fixedly connected to the connection tube. Therefore, the laser should be irradiated while being inclined to a virtual line, parallel to the finger member, at an angle of 15 degrees or more.

As described above, in the related art, the laser should be irradiated while being inclined to a virtual line, parallel to a length direction of the finger member, at an angle of 15 degrees or more such that the finger member would be fixedly connected to the evaporation tube using laser welding. Therefore, the laser welding was not easily performed.

In addition, since the above-mentioned laser irradiation angle should be secured, there was a limitation in a gap between finger members.

In addition, as described above, formation of the connection surface on the evaporation tube and a process such as a burring process for forming the connection protrusion were further required, and the evaporator for ice-making was not easily manufactured.

In addition, when a finger member was formed by a drawing process, many portions of a material of the finger member were cut to be thrown away after the drawing process. Therefore, a relatively large amount of material for forming the finger member was required.

In addition, the connection projection formed by the burring process had a relatively great deviation in length.

Accordingly, a welding defect rate was relatively high during the above-described laser welding.

A diaphragm member may be provided inside the finger member. In this case, a bonding material for fixing the diaphragm member to the finger member or the evaporation tube was applied to the diaphragm member as well as an inside of the evaporation tube. As described above, since the bonding material should be applied to the inside of the evaporation tube, the bonding material was easily applied.

In addition, a capillary tube, a heater for separation of ice made in the finger member, or a heater insertion tube, into which the heater is inserted, may be inserted into the evaporation tube. Since the heater or the heater insertion tube was inserted after the evaporation tube is formed, the type and number of tubes inserted into the evaporation tube were limited.

In addition, a portion in which a refrigerant discharge pipe for discharging a refrigerant from the evaporation tube was connected to the evaporation tube was limited to the connection surface of the evaporation tube, or the like, so that a flow of the refrigerant after the evaporation tube was not smooth.

DISCLOSURE

Technical Problem

The present disclosure is provided by recognizing at least one of the demands or issues which occur in the related art as described above.

An aspect of the present disclosure is to easily manufacture an evaporator for ice-making.

Another aspect of the present disclosure is to easily connect finger members included in an evaporator for ice-making.

Another aspect of the present disclosure is to provide an evaporator in which a finger member, having an external circumferential surface on which a protrusion is formed, is inserted into a through-hole formed in a plate member formed having a development shape of a pipe and the protrusion is caught on a portion of the plate member around the through-hole, so that at least a portion of the finger member may penetrate through the through-hole.

Technical Solution

According to an aspect of the present disclosure, a method for manufacturing an evaporator for ice-making includes: a preparation operation of preparing a plate member provided with a through-hole formed therein and having a development shape of a pipe, a finger member, and a capillary tube; an insertion operation of inserting the finger member into the through-hole such that at least a portion of the finger member penetrates through the through-hole; a connection operation of fixedly connecting the finger member to the plate member; an insert placement operation of placing at least a portion of the capillary tube on the plate member; and an evaporation tube forming operation of bending the plate member in a form of a pipe and connecting end portions of the plate member to form an evaporation tube in which a refrigerant flow path, through which a refrigerant flows, is formed.

A protrusion may be formed on an external circumferential surface of an upper end portion of the finger member to be caught on a portion of the plate member around the through-hole.

In in the connection operation, the finger member may be fixedly connected to the plate member by laser welding.

In the connection operation, a laser may be irradiated on a portion of the plate member around the through-hole with which the protrusion is in contact.

In the connection operation, the laser may be irradiated to be parallel to a virtual line parallel to a length direction of the finger member, or to be inclined to the virtual line at an angle of 15 degrees or less.

The through-hole may be provided with a plurality of through-holes formed in the plate member, and the finger member may be provided with a plurality of finger members to be prepared.

In the insertion operation, a lower portion of the finger member may be first inserted into the through-hole such that the finger member penetrates through the through-hole, and then the protrusion on the upper end portion of the finger member may be caught on the portion of the plate member around the through-hole.

A flow space having an open upper portion and a closed lower portion may be formed in the finger member, a diaphragm member may be further prepared in the preparation operation, and at least a portion of the diaphragm member may be inserted into the flow space in the insertion operation.

A passage hole may be formed in a portion of the diaphragm member which is not inserted into the flow space. In the insert placement operation, at least a portion of the capillary tube passes through the passage hole to be disposed on the plate member.

The method may further include: a bonding material applying operation of applying a bonding material to a portion of the plate member to be in contact with the diaphragm member; and a bonding material curing operation of curing the bonding material.

In the insert placement operation, a heater insertion tube or a heater may be further placed on the plate member.

According to an aspect of the present disclosure, an evaporator for ice-making may include: an evaporation tube in which a refrigerant flow path is formed; a capillary tube directly connected to the evaporation tube to supply a refrigerant to the refrigerant flow path; a finger member, connected to the evaporation tube such that the refrigerant is introduced into or discharged from the refrigerant flow path, in which ice is made; and a refrigerant discharge pipe connected to the evaporation pipe to discharge a refrigerant flowing through the refrigerant flow path and the finger member.

A plurality of finger members may be connected to the evaporation tube.

A flow space may be formed in the finger member to be connected to the refrigerant flow path.

At least a portion of the diaphragm member may be inserted into the flow space, and the flow space may be divided into an inflow space, in which a refrigerant is introduced from the refrigerant flow path, and an outflow space in which a refrigerant is discharge to the refrigerant flow path.

A communication hole may be formed in the diaphragm member such that the inflow space and the outflow space communicate with each other.

The capillary tube may penetrate through one surface of the evaporation tube such that at least a portion of the capillary tube is disposed on the refrigerant flow path.

The diaphragm member may be provided with a passage hole through which at least a portion of the capillary tube passes.

The evaporator for ice-making may further include: a heater provided in the evaporation tube to separate ice, made in the finger member, from the finger member.

A heater insertion pipe may penetrate through one surface of the evaporation tube such that at least a portion of the heater insertion pipe is disposed on the refrigerant flow path, and the heater may be inserted into the heater insertion pipe.

The diaphragm member may be provided with a passage hole through which at least a portion of the heater insertion pipe passes.

Advantageous Effects

As described above, a finger member, having an external circumferential surface on which a protrusion is formed, is inserted into a through-hole formed in a plate member having a development shape of a pipe and the protrusion is caught on a portion of the plate member around the through-hole, so that at least a portion of the finger member may penetrate through the through-hole.

In addition, finger members included in an evaporator for ice-making may be easily connected.

In addition, an evaporator for ice-making may be easily manufactured.

BEST MODE FOR INVENTION

Figure 1:
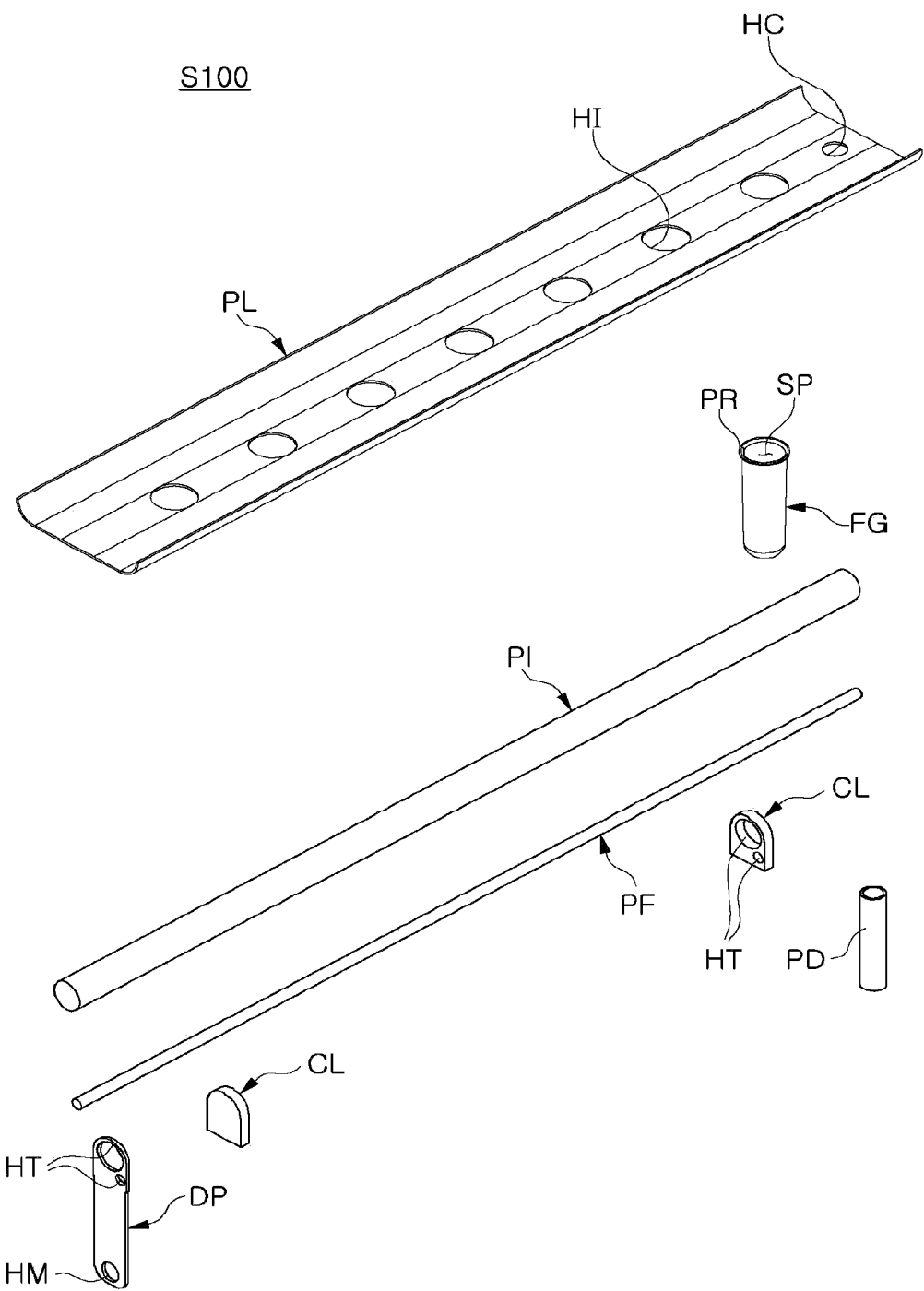
FIG. 1 is a diagram illustrating a preparation operation in a method of manufacturing an evaporator for ice-making according to an example embodiment of the present disclosure.

To help understanding of features of the present disclosure above, example embodiments of a method for manufacturing an evaporator for ice-making and an evaporator for ice-making will be described more fully with reference to accompanying drawings.

In the descriptions below, the present disclosure will be described based on the most appropriate example embodiments for an understanding of technical features in the present disclosure. It is to be understood that the technical features of the present disclosure are not limited to the example embodiments, and the present disclosure may be implemented as in the example embodiments described herein. Thus, the present disclosure may be modified in various manners through the example embodiments described herein within the technical scope of the present disclosure, and the modified example embodiments are to be included in the technical scope of the present disclosure. Also, to help in an understanding of the example embodiments, as for reference numerals in the attached drawings, relevant elements among elements having the same function in the example embodiments are indicated by the same or similar forms of reference numeral.

Method of Manufacturing Evaporator for Ice-Making

Hereinafter, a method for manufacturing an evaporator for ice-making according to an example embodiment of the present disclosure will be described with reference to FIGS. 1 to 7.

Figure 2:
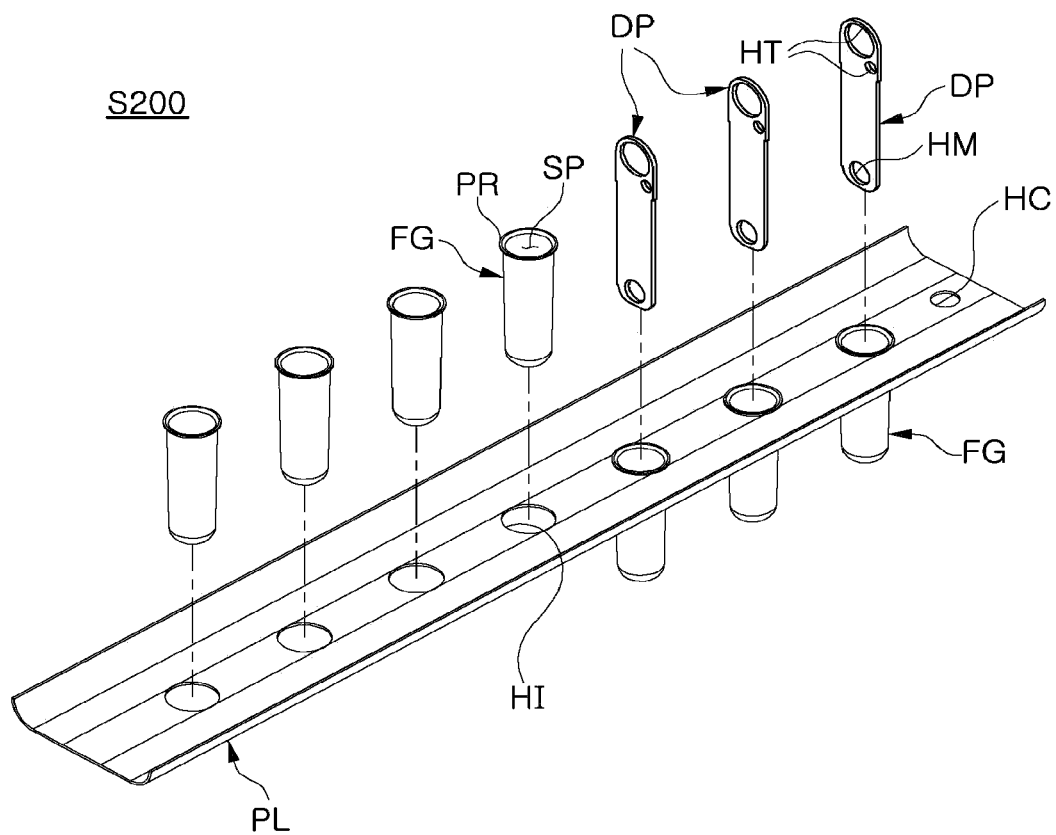
FIG. 2 is a diagram illustrating an insertion operation in the method of manufacturing an evaporator for ice-making according to an example embodiment of the present disclosure.
Figure 3:
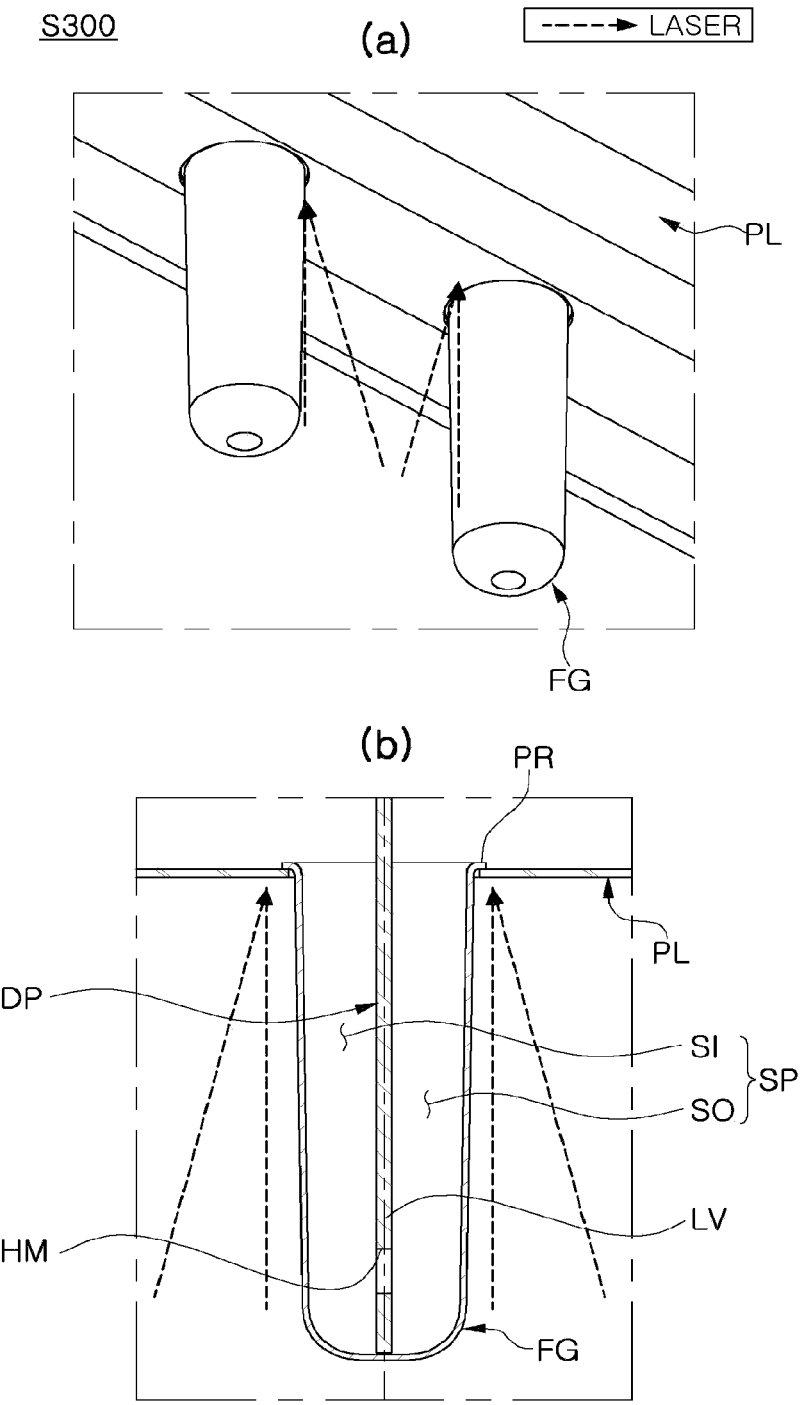
FIG. 3 is a diagram illustrating a connection operation in the method of manufacturing an evaporator for ice-making according to an example embodiment of the present disclosure.
Figure 4:
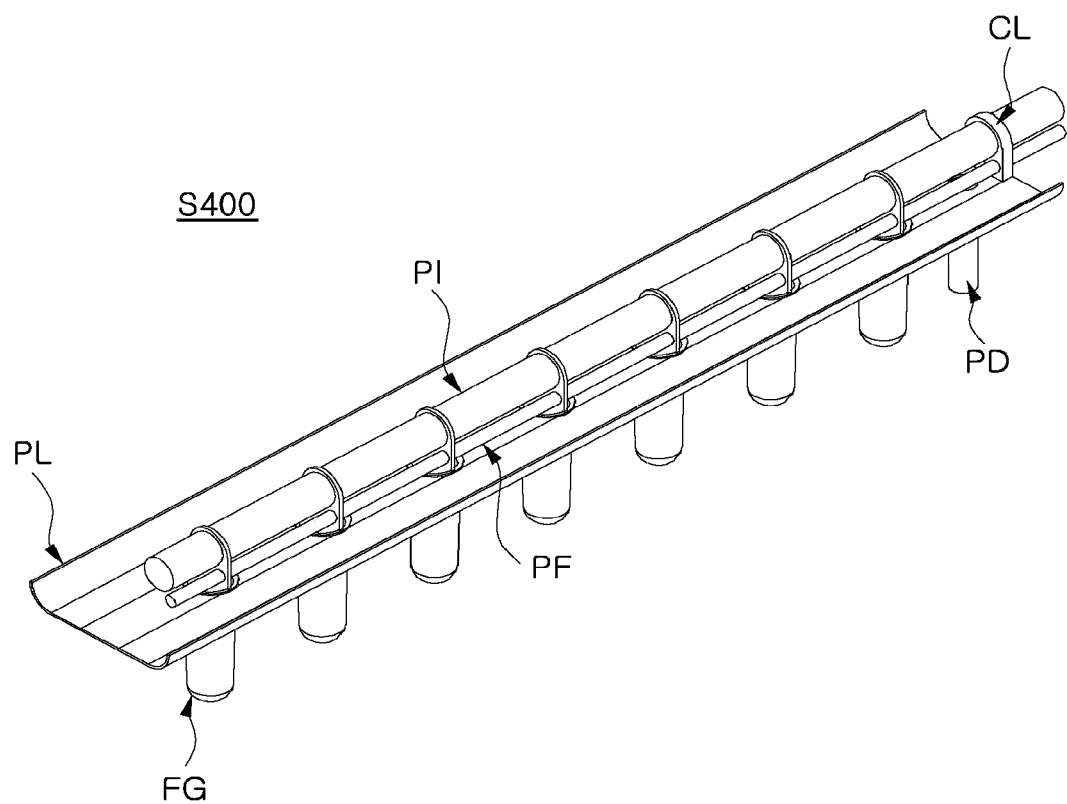
FIG. 4 is a diagram illustrating an insert placement operation in the method of manufacturing an evaporator for ice-making according to an example embodiment of the present disclosure.

FIG. 1 is a diagram illustrating a preparation operation in a method of manufacturing an evaporator for ice-making according to an example embodiment, FIG. 2 is a diagram illustrating an insertion operation in the method of manufacturing an evaporator for ice-making, FIG. 3 is a diagram illustrating a connection operation in the method of manufacturing an evaporator for ice-making, and FIG. 4 is a diagram illustrating an insert placement operation in the method of manufacturing an evaporator for ice-making.

Figure 5:
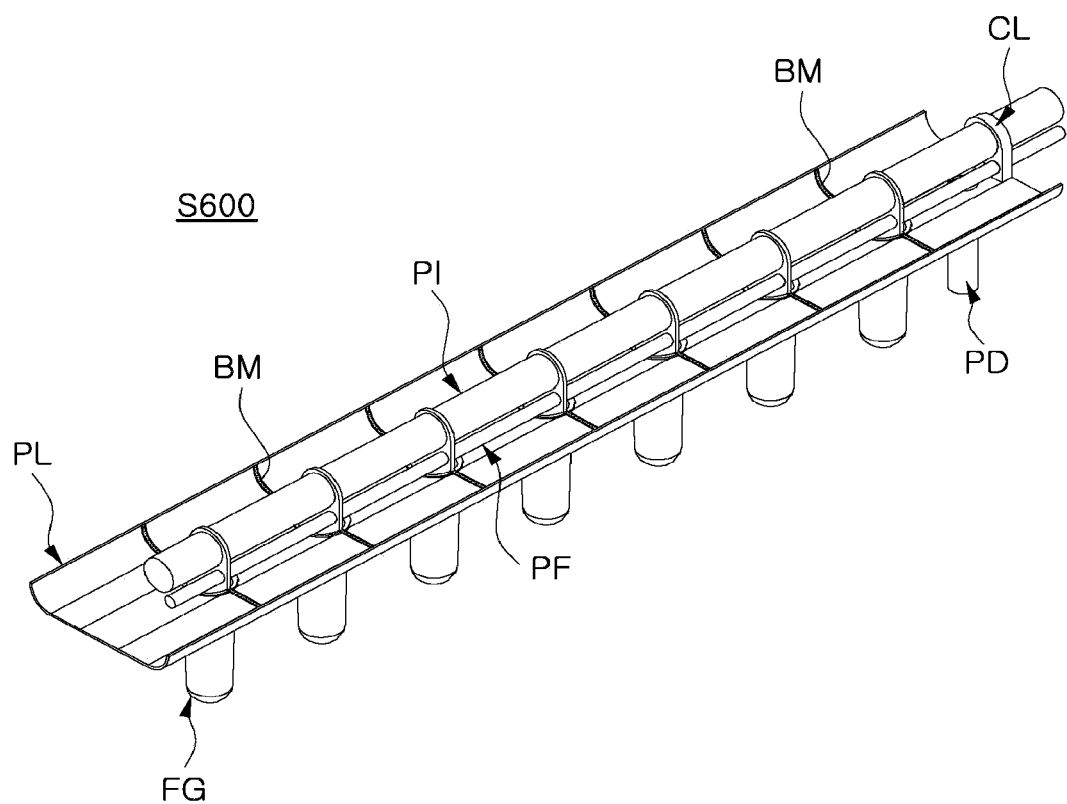
FIG. 5 is a diagram illustrating a bonding material applying operation in the method of manufacturing an evaporator for ice-making according to an example embodiment of the present disclosure.
Figure 6:
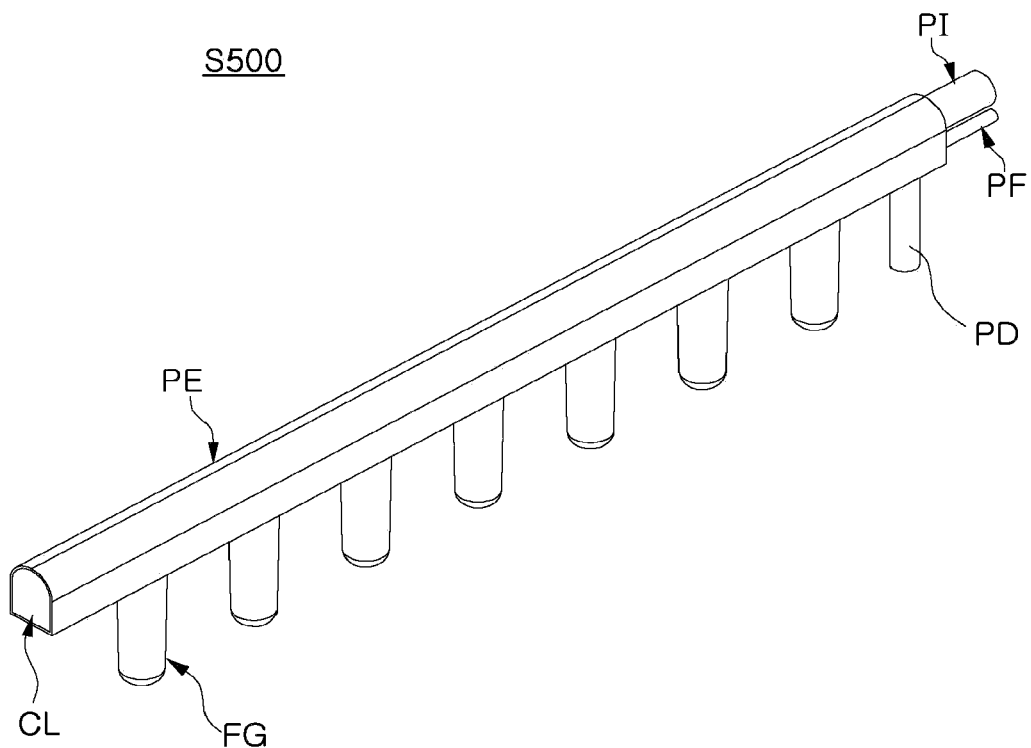
FIG. 6 is a diagram illustrating an evaporation tube forming operation in the method of manufacturing an evaporator for ice-making according to an example embodiment of the present disclosure.
Figure 7:
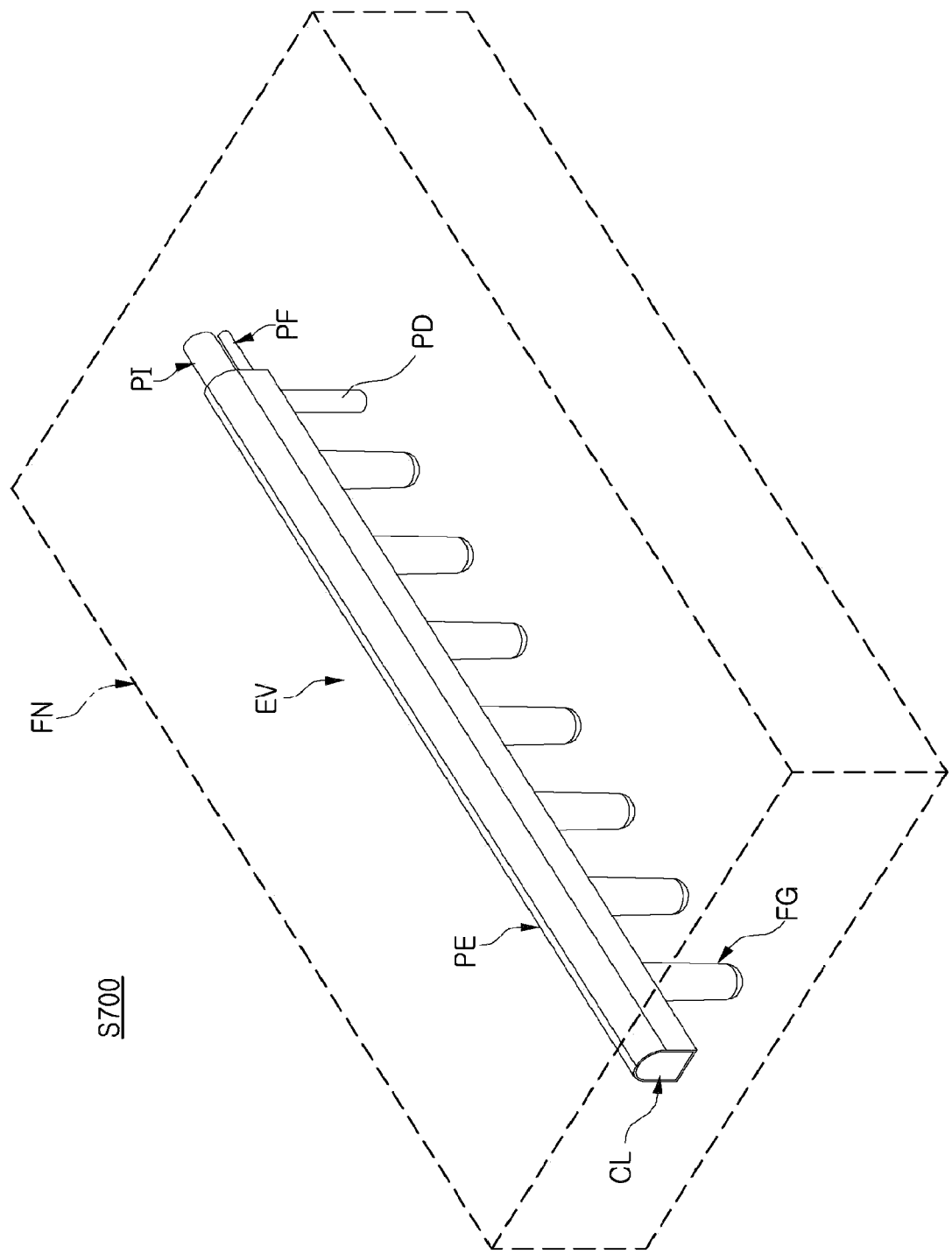
FIG. 7 is a diagram illustrating an adhesive curing operation in the method of manufacturing an evaporator for ice-making according to an example embodiment of the present disclosure.

In addition, FIG. 5 is a diagram illustrating a bonding material applying operation in the method of manufacturing an evaporator for ice-making, FIG. 6 is a diagram illustrating an evaporation tube forming operation in the method of manufacturing an evaporator for ice-making, and FIG. 7 is a diagram illustrating an adhesive curing operation in the method of manufacturing an evaporator for ice-making.

A method for manufacturing an evaporator for ice-making according to an example embodiment may include a preparation operation S100, an insertion operation S200, a connection operation S300, an insert placement operation S400, and an evaporation tube forming operation S400.

As illustrated in FIG. 1, in the preparation operation S100, a plate member PL, a finger member FG, and a capillary tube PF may be prepared.

The plate member PL, prepared in the preparation operation S100, may have a development shape of a pipe. Accordingly, as will be described later and illustrated in FIG. 6, in the evaporation tube forming operation S500, the plate member PL may be bent in the form of a pipe and end portions thereof may be connected to implement an evaporation tube PE in which a refrigerant flow path FP, through which a refrigerant flows, is formed.

A through-hole HI may be formed in the plate member PL prepared in the preparation operation S100. For example, in the preparation operation S100, a plurality of through-holes HI may be formed in a central portion of the plate member PL in a line at predetermined intervals, as illustrated in FIG. 1. However, the number and arrangement of through-holes HI formed in the plate member PL in the preparation operation S100 are not limited, and any number and arrangement may be employed. Furthermore, only one through-hole HI may be formed.

A connection hole HC, to which a refrigerant discharge pipe PD is connected, may be formed in the plate member PL, as illustrated in FIG. 5. Accordingly, the refrigerant discharge pipe PD may be connected to a portion in which a refrigerant may smoothly flow.

A protrusion PR may be formed on an external circumferential surface of an upper end portion of the finger member FG prepared in the preparation operation S100. As illustrated in (b) of FIG. 3, the protrusion PR of the finger member FG may be caught on a portion of the plate member PL around the through-hole HI of the plate member PL when the finger member FG is inserted into the through-hole HI of the plate member PL such that at least a portion of the finger member FG penetrates through the through-hole HI in the insertion operation S200 as will be described later and illustrated in FIG. 2. Accordingly, the finger member FG may be easily positioned in the through-hole HI such that at least a portion of the finger member FG passes through the through-hole HI of the plate member PL, and fixedly connecting the finger member FG to the plate member PL may be easily performed.

The finger member FG may be formed by a drawing process. When the finger member FG is formed by a drawing process, the protrusion PR may be naturally formed on the finger member FG. Therefore, portions of a material (not illustrated) of the finger member, cut to be thrown away after the drawing process, may be reduced. As a result, a relatively small amount of material of the finger member FG may be required when the finger member FG is formed.

In addition, the protrusion PR formed as described above has a relatively small deviation in length. Therefore, a welding defect rate during welding of the protrusion PR of the finger member FG and the plate member PL around the through-hole HI may be decreased, as will be described later.

In the preparation operation S100, a plurality of finger members FG may be prepared. The number of finger members FG prepared in the preparation operation S100 is not limited, and any number of finger members FG may be employed. Furthermore, only one finger member FG may be prepared.

The finger member FG may have a flow space SP having an open upper portion and a closed lower portion, as illustrated in FIG. 1. Accordingly, as will be described later and illustrated in FIG. 6, in the evaporation tube forming operation S500, the plate member PL may be bent in the form of a pipe and end portions thereof may be connected to implement an evaporation tube PE in which a refrigerant flow path FP, through which a refrigerant flows, is formed. When the evaporation tube PE is formed as described above, the open upper portion of the flow space SP of the finger member FG may be connected to the refrigerant flow path FP of the evaporation tube PE.

Together with the evaporation tube PE, the capillary tube PF may be included in a refrigeration cycle (not illustrated) in which the refrigerant changes in state while circulating and a temperature and a pressure change. As will be described later, at least a portion of the capillary tube PF may be disposed on the plate member PL in the insert placement operation S400, and the plate member PL may serve as the evaporation tube PE in the evaporation tube forming operation S500. By doing so, one side of the capillary tube PF may be inserted into the evaporation tube PE to be connected to the evaporation tube PE. In addition, the other side of the capillary tube PF may be connected to a condenser (not shown) included in the refrigeration cycle. Accordingly, a liquid refrigerant condensed by the condenser may flow through the capillary tube PF and then may be introduced into the evaporation tube PE to be expanded, for example, a pressure may be decreased. The capillary tube PF is not limited, and any known capillary tube, having one side connected to the evaporation tube PE and the other side connected to the condenser of the refrigeration cycle, in which a refrigerant may be expanded, may be employed.

In the preparation operation S100, a diaphragm member DP may be further prepared. At least a portion of the diaphragm member DP may be inserted into the flow space SP of the finger member FG in the insertion operation S200. The diaphragm member DP may dividing the flow space SP of the finger member FG into an inflow space SI, in which the refrigerant is introduced from the refrigerant flow path FP of the evaporation tube PE, and an outflow space SO, in which the refrigerant is discharged to the refrigerant flow path PF of the evaporation tube PE, as illustrated in (b) of FIG. 3. Accordingly, the refrigerant flowing through the refrigerant flow path FP of the evaporation tube PE may also flow into the flow space SP of the finger member FG, allowing ice (not illustrated) to be more smoothly made on the finger member FG.

A communication hole HM may be formed in a portion of the diaphragm member DP inserted into the flow space SP of the finger member FG, for example, a lower portion of the finger member FG, as illustrated in FIGS. 1 and 2 and (b) of FIG. 3. The inflow space SI and the outflow space SO of the flow space SP of the finger member FG, divided by the diaphragm member DP, may communicate with each other due to the communication hole HM. In addition, the refrigerant in the inflow space SI of the flow space SP may flow into the outflow space SO through the communication hole HM.

A passage hole HT may be formed in a portion of the diaphragm member DP that is not inserted into the flow space SP of the finger member FG, for example, an upper portion of the finger member FG, as illustrated in FIGS. 1 and 2 and (b) of FIG. 3. For example, two passage holes HT having different sizes may be formed in the diaphragm member DP. In the insert placement operation S400, at least a portion of the capillary tube PF may be disposed on the plate member PL through a small-sized passage hole HT, and at least a portion of a heater insertion tube PI may be disposed on the plate member PL through a large-sized passage hole HT. Accordingly, the capillary tube PF and the e tube PI may be disposed so as not to move in place on the plate member PL. Thus, the evaporation tube forming operation S500, and the like, may be easily performed.

In the preparation operation S100, as illustrated in FIG. 1, when the plate member PL is bent in the form of a pipe and the end portions thereof are connected to form the evaporation tube PE in the evaporation tube forming operation S500, a closing member CL, closing one and the other open end portions of the refrigerant flow path FP, and a refrigerant discharge pipe PD, through which the refrigerant is discharged from the evaporation tube PE, may also be prepared.

As illustrated in FIG. 1, a passage hole HT, through which at least a portion of the capillary tube PF or the heater insertion tube PI passes, may be formed in the closing member CL closing the other open end portion, so that the capillary tube PF or the heater insertion tube may be supported.

In the insertion operation S200, the finger member FG may be inserted into the through-hole HI of the plate member PL to allow at least a portion of the finger member FG to penetrate through the through-hole HI.

For example, in the insertion operation S200, as illustrated in FIG. 2, a lower portion of the finger member (FG) may be inserted into the through-hole HI to penetrate through the through-hole HI, and then the protrusion PR of the upper end portion of the finger member FG may be caught on a portion of the plate member PL around the through-hole HI. Therefore, by inserting the finger member FG into the through-hole HI of the plate member PL with only a weight of the finger member FG without any external force, the finger member FG may be positioned in the through-hole HI such that at least a portion of the finger member FG penetrates through the through-hole HI. Thus, the finger member FG may be easily positioned in the through-hole HI such that at least a portion of the finger member FG penetrates through the through-hole HI of the plate member PL. In addition, the finger member FG may be easily connected to the plate member PL by laser welding, or the like, as will be described later.

In the insertion operation S200, at least a portion of the diaphragm member DP may be inserted into the flow space SP of the finger member FG. Even in this case, by inserting at least a portion of the diaphragm member DP into the flow space SP of the finger member FG with only the weight of the diaphragm member DP without any external force, at least a portion of the diaphragm member DP may be positioned in the flow space SP of the member FG. Thus, the flow space SP of the finger member FG may be easily divided into the inflow space SI and the outflow space SO by the diaphragm member DP.

In the connection operation S300, the finger member FG may be fixedly connected to the plate member PL.

In the connection operation S300, the finger member FG may be fixedly connected to the plate member PL by laser welding. However, a method of fixing the finger member FG to the plate member PL in the connection operation S300 is not limited, and any known method such as a connection method using a bonding material, or the like, may be employed.

As described above, when the finger member FG is fixedly connected to the plate member PL by laser welding, a laser may be irradiated on a portion of the plate member PL around the through-hole HI of the plate member PL, with which the protrusion PR of the finger member FG is in contact, as illustrated in FIG. 3. Accordingly, conventional processes such as a process of forming a connection surface on an evaporation tube, a burring process of forming a connection projection around a through-hole of an evaporation tube, and the like, are not required, so that an evaporator EV for ice-making may be easily manufactured.

During the laser welding for fixedly connecting the finger member FG to the plate member PL, the laser may be irradiated to be parallel to a virtual line LV parallel in a length direction of the finger member FG or may be irradiated to be inclined to the virtual line VL at an angle of 15 degrees or less, as illustrated in FIG. 3. Accordingly, a limitation in a gap between the finger members FG may be significantly reduced.

In the insert placement operation S400, at least a portion of the capillary tube PF may be placed on the plate member PL. In this state, due to the plate member PL to serve as the evaporation tube PE in the evaporation tube forming operation S500, the at least a portion of the capillary pipe PF may be inserted into the evaporation tube PE to be connected to the evaporation tube PE.

Accordingly, the type or number of a tube or another insert such as a capillary tube PF or a heater insertion tube PI to be described later, having at least a portion inserted into the evaporation tube PE, may not be limited.

Moreover, similarly to in the case in which the capillary tube PF and the evaporation tube PE are connected by a separate connection tube (not illustrated), the refrigerant having a temperature lower than or equal to a freezing point, discharged from the capillary tube PF, may receive heat transferred from surroundings while flowing through the connection tube, so that a temperature may not be increased. Accordingly, since the refrigerant having a temperature lower than or equal to a freezing point may flow inside the finger member FG connected to the evaporation tube PE, ice may be smoothly made in the finger member FG.

As illustrated in FIG. 4, at least a portion of the capillary tube PF may be disposed on the plate member PL such that one side of the capillary tube PF extends to one side of the plate member PL. Accordingly, the refrigerant may be first supplied to a portion of the refrigerant flow path FP on the one side of the evaporation tube PE. The refrigerant, supplied to the portion of the refrigerant flow path FP on the one side of the evaporation tube PE, may sequentially flow through flow spaces SP of a plurality of finger members FG connected to the evaporation tube PE while flowing through the refrigerant flow path FP to a portion of the refrigerant flow path FP on the other side of the evaporation tube PE.

In the insert placement operation S400, at least a portion of the capillary tube PF may be disposed on the plate member PL through the passage hole HT of the diaphragm member DP. Accordingly, the capillary tube PF may be disposed so as not to move in place on the plate member PL, so that the evaporation tube forming operation S500, and the like, may be easily performed.

In the insert placement operation S400, at least a portion of the heater insertion tube PI may be further disposed on the plate member PL. A heater HE may be inserted into the heater insertion tube PI. In addition, when ice having a predetermined size is made in the finger member FG, the heater HE may operate such that the ice having a predetermined size, made in the finger member FG, is separated from the finger member FG. Alternatively, ice may be separated from the finger member FG by allowing a refrigerant having a temperature higher than or equal to the freezing point to flow through the capillary tube PF.

At least a portion of the heater insertion tube PI may be disposed on the plate member PL through the passage hole HT of the diaphragm member DP. Accordingly, the heater insertion tube PI can be disposed so as not to move in place on the plate member PL, so that the evaporation tube forming operation S500, and the like, may be easily performed.

In the insert placement operation S400, as illustrated in FIG. 4, the closing member CL having the through-hole HT formed therein may be provided on the other side of the plate member PL to support the capillary tube PF or the heater insertion tube PI.

In the insert placement operation S400, at least a portion of the heater HE may be further disposed directly on the plate member PL.

In the evaporation tube forming operation (S500), the plate member PL may be in the form of a pipe and the end portion thereof may be connected, serving as the evaporation tube PE in which a refrigerant flow path FP, through which the refrigerant flows, is formed.

In the evaporation tube forming operation S500, the plate member PL may be provided with the closing member CL closing the one open end portion or the other open end portion of the refrigerant flow path FP of the evaporation tube PE before bending the plate member PL in the form of a pipe. In this case, as described above, the passage hole HT, through which the heater insertion tube PI or the capillary tube PE passes, may be formed.

In the evaporation tube forming operation S500, the plate member PL may be bent in the form of a pipe and the end portions thereof may be connected by laser welding to form the evaporation tube PE. However, the configuration of bending the plate member PL in the form of a pipe and connecting the end portions thereof to form the evaporation tube PE is not limited, and any known configuration of connecting the end portions by a bonding material may be employed.

The method of manufacturing an evaporator for ice-making according to an example embodiment may further include a bonding material applying operation S600 and a bonding material curing operation S700.

In the bonding material applying operation S600, as illustrated in FIG. 5, a bonding material BM may be applied to a portion of the plate member PL to be in contact with the diaphragm member DP. Accordingly, application of the bonding material BM may be easily performed. The bonding material BM may be, for example, a paste. However, the bonding material BM is not limited, and any known bonding material may be employed.

The bonding material applying operation S600 may be performed between the insert placement operation S400 and the evaporation tube forming operation S500. However, the bonding material applying operation S600 may be performed, for example, before the insert displacement operation S400 as long as the bonding material BM may be applied to the portion of the plate member PL in contact with the diaphragm member DP.

The bonding material BM may be applied to the diaphragm member DP, the capillary tube PF, or the heater insertion tube PI, other than the above-described plate member PL. For example, the bonding material BM may be applied to a portion of the diaphragm member DP in contact with the finger member FG and the evaporation tube PE, the passage hole HT of the diaphragm member DP, or a portion of the capillary tube PF or the heater insertion tube PI in contact with the passage hole HT. The application of the bonding material BM to the diaphragm member DP, the capillary tube PF, or the heater insertion tube PI may be performed in the bonding material applying operation S600, or may be performed in the preparation operation S100, the insertion operation S200, the insert placement operation S400, or the like.

In the bonding material curing operation S700, the bonding material BM may be cured. Accordingly, the diaphragm member DP may be fixed to the evaporation tube PE or the finger member FG. In addition, the capillary tube PF or the heater insertion tube PI may be fixed to the diaphragm member DP. In the bonding material curing operation S700, for example, the evaporator EV for ice-making may be inserted into a heating furnace FN to heat and cure the bonding material BM, as illustrated in FIG. 7. However, a method of curing the bonding material BM in the bonding material curing operation S700 is not limited, and any known method may be employed as long as the bonding material BM is cured. The bonding material curing operation S700 may be performed, for example, after the evaporation tube forming operation S500. However, the bonding material curing operation S700 may be performed, for example, even after the bonding material applying operation S600 as long as the bonding material BM may be cured.

Evaporator for Ice-Making

Hereinafter, an evaporator for ice-making according to an example embodiment of the present disclosure will be described with reference to FIG. 8 and FIGS. 1 to 7.

Figure 8:
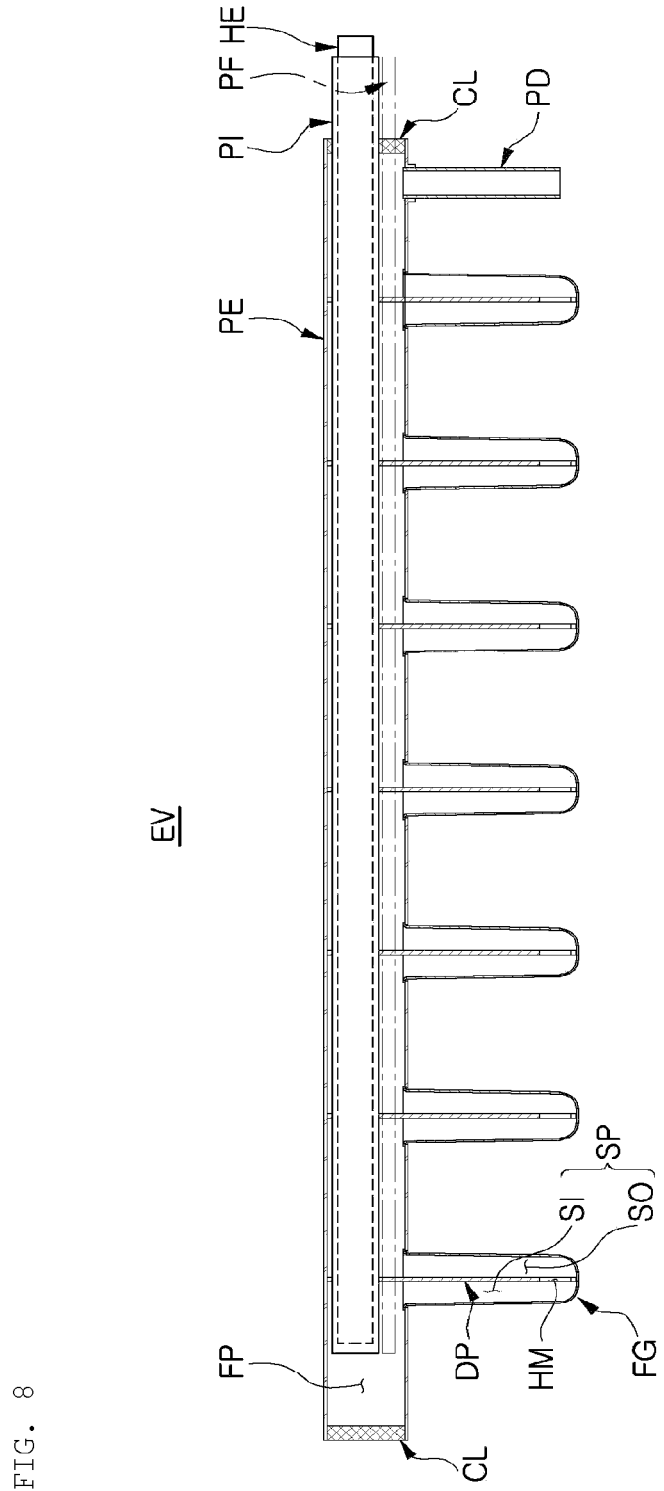
FIG. 8 is a cross-sectional view of an evaporator for ice-making according to an example embodiment of the present disclosure.

FIG. 8 is a cross-sectional view of an evaporator for ice-making according to an example embodiment of the present disclosure.

An evaporator EV for ice-making according to an example embodiment may include an evaporation tube PE, a capillary tube PF, a finger member FG, and a refrigerant discharge pipe PD.

Together with the capillary tube PF, the evaporation tube PE may be included in a refrigeration cycle (not illustrated). The evaporation tube PE may be provided with a refrigerant flow path FP formed therein. The refrigerant supplied by the capillary tube PF, for example, a refrigerant having a temperature lower than or equal to a freezing point may flow through the refrigerant flow path FP. In addition, a refrigerant having a temperature higher than the freezing point may flow through the capillary tube PF.

As described above, the evaporation tube PE may be formed by bending the plate member PL in the form of a pipe and connecting end portions thereof, so that the refrigerant flow path FP may be formed in the evaporation tube PE. In this case, one open end portion and the other open end portion of the refrigerant flow path FP may be closed by a closing member CL, as described above. A shape of the evaporation tube PE is not limited, and any shape may be employed as long as the refrigerant flow path FP may be formed therein.

As described above, a through-hole HI may be formed in the plate member PL to serve as the evaporation tube PE, so that the finger member FG may be connected to the evaporation tube PE. The refrigerant discharge pipe PD may be connected to the evaporation tube PE having a connection hole HC formed in the plate member PL to serve as the evaporation tube PE. A passage hole HT, through which at least a portion of the capillary tube PF or the heater insertion tube PI passes, may be formed in the closing member CL closing the one open end portion or the other open end portion of the refrigerant flow path FP.

As described above, together with the evaporation tube PE, the capillary tube PF may be included in a refrigeration cycle. The capillary tube PF may be directly connected to the evaporation tube PE. Accordingly, similarly to the case in which the capillary tube PF and the evaporation tube PE are connected by a separate connection tube (not illustrated), a refrigerant having a temperature lower than or equal to the freezing point, discharged from the capillary tube PF, may receive heat transferred from surroundings while flowing through the connection tube, so that a temperature may not be increased. Accordingly, a refrigerant having a temperature lower than or equal to the freezing point of a temperature, lower than a temperature when the capillary tube PF and the evaporation tube PE are connected by a separate connection tube, may be supplied to the evaporation tube PE through the capillary tube PF. As a result, a refrigerant having a temperature lower than or equal to the freezing point of the lower temperature may also flow into the finger member FG connected to the evaporation tube PE, so that ice 'I' may be more smoothly made in the finger member FG.

The capillary tube PF may be connected to a condenser (not illustrated) included in the refrigeration cycle. A refrigerant, for example, a refrigerant having a temperature lower than or equal to the freezing point may be supplied to a refrigerant flow path FP of the evaporation tube PE by the capillary tube PF. When the refrigerant having a temperature lower than or equal to the freezing point is supplied to the refrigerant flow path FP of the evaporation tube PE by the capillary tube PF, ice 'I' may be made in the finger member FG.

A refrigerant having a temperature higher than the freezing point may also be supplied to the refrigerant flow path FP of the evaporation tube PE by the capillary tube PF. When the refrigerant having a temperature higher than the freezing point is supplied to the refrigerant flow path FP of the evaporation tube PE by the capillary tube PF, the capillary tube PF may be connected to an outlet of a compressor (not illustrated) included in the refrigeration cycle. For example, a refrigerant flow line (not illustrated), connecting the outlet of the compressor and an inlet of a condenser to each other, and a bypass line (not illustrated), connecting an outlet of the compressor and an inlet of the capillary tube PE to each other, may be connected to each other. In addition, the bypass line may be provided with an on-off valve (not illustrated). When the on-off valve is opened, the outlet of the compressor and the inlet of the capillary tube PF may be connected to each other by the bypass line, so that the refrigerant having a temperature higher than the freezing point, discharged from the outlet of the compressor, may be introduced to the inlet of the capillary tube PF.

As described above, when the refrigerant having a temperature higher than the freezing point is supplied to the refrigerant flow path FP of the evaporation tube PE by the capillary tube PF, the ice 'I' made in the finger member FG may be separated from the finger member FG.

The capillary tube PF may penetrate through one surface of the evaporation tube PE such that at least a portion of the capillary tube PF is disposed on the refrigerant flow path FP. For example, as described above, the capillary tube PF may pass through the passage hole HT of the closing member CL, so that at least a portion of the capillary tube PF may be disposed on the refrigerant flow path FP of the evaporation tube PE. In this case, the capillary tube PF may extend from the refrigerant flow path FP to the vicinity of the closing member CL in which the passage hole HT is not formed, as illustrated in FIG. 8. Accordingly, as described above, the refrigerant may be first supplied to a portion of the refrigerant flow path FP on one side of the evaporation tube PE. In addition, the refrigerant supplied to the portion of the refrigerant flow path FP on one side of the evaporation tube PE may sequentially flow spaces SP of a plurality of finger members FG connected to the evaporation tube PE while flowing through the refrigerant flow path FP to a portion of the refrigerant flow path FP on the other side of the evaporation tube PE.

However, the configuration of directly connecting the capillary tube PF to the evaporation tube PE is not limited, and any known configuration may be employed as long as a refrigerant, for example, a refrigerant having a temperature lower than or equal to the freezing point or a refrigerant having a temperature higher than the freezing point may be supplied.

An expansion valve (not illustrated), which may be included in the refrigeration cycle instead of the capillary tube PF, and a connection tube (not illustrated), connected to the expansion valve, may be used instead of the capillary tube PF. In this case, the connection tube may be covered with an insulating member (not illustrated), or the like, such that the refrigerant having a temperature lower than or equal to the freezing point, discharged from the expansion valve to flow through the connection tube, receives heat transferred from surroundings to prevent an increase in temperature. Alternatively, a distance between the evaporation tube PE and the expansion valve may be set to be relatively short such that heat transfer from surroundings to the refrigerant having a temperature lower than or equal to the freezing point is significantly reduced.

The finger member FG may be connected to the evaporation tube PE. As described above, the finger member FG may be inserted into the through-hole HI formed in the plate member PL to serve as the evaporation tube PE, and may be connected to the plate member PL to be connected to the evaporation tube PE while at least a portion of the finger member FG penetrates through the through-hole HI.

A plurality of finger members FG may be connected to the evaporation tube PE. The number of finger members FG is not limited, and any number of finger members FG may be employed. Furthermore, only one finger member FG may be employed.

The refrigerant on the refrigerant flow path FP of the evaporation tube PE may be introduced into or discharged from the finger member FG. Accordingly, making ice in the finger member FG or separating ice from the finger member FG may be smoothly performed.

To this end, a flow space SP may be formed in the finger member FG to be connected to the refrigerant flow path FP of the evaporation tube PE. In addition, at least a portion of the diaphragm member DP may be inserted into the flow space SP to divide the flow space SP into an inflow space SI, in which the refrigerant is introduced from the refrigerant flow path FP of the evaporation tube PE, and an outflow space SO in which the refrigerant is discharged to the refrigerant flow path PF of the evaporation tube PE.

A communication hole HM may be formed in the diaphragm member DP. The inflow space SI and the outflow space SO of the flow space SP of the finger member FG, divided by the diaphragm member DP, may communicate with each other due to the communication hole HM. In addition, the refrigerant in the inflow space SI of the flow space SP may flow into the outflow space SO through the communication hole HM. The communication hole HM may be formed in a portion of the diaphragm member DP inserted into the flow space SP of the finger member FG, for example, a lower portion of the finger member FG.

A passage hole HT may be formed in the diaphragm member DP. For example, two passage holes HT having different sizes may be formed in the diaphragm member DP. In addition, at least a portion of the capillary tube PF may pass through a small-sized passage hole HT, and at least a portion of the heater insertion tube PI may pass through a large-sized passage hole HT. Accordingly, the capillary tube PF and the heater insertion tube PI may be supported by the diaphragm member DP.

The passage hole HT may be formed in a portion of the diaphragm member DP that is not inserted into the flow space SP of the finger member FG, for example, in an upper portion of the finger member FG.

When the finger member FG is immersed in water contained in a water tray (not illustrated) while a refrigerant having a temperature lower than or equal to the freezing point flows in the flow space SP of the finger member FG, ice may be made in the finger member FG by heat exchange between the refrigerant having a temperature lower than or equal to the freezing point in the flow space SP and the water contained in the water tray, for example, heat transfer from the water contained in the water tray to the refrigerant having a temperature lower than or equal to the freezing point of the flow space SP.

When a refrigerant having a temperature higher than the freezing point flows in the flow space SP of the finger member FG while the ice is made in the finger member FG, the ice made in the finger member FG may be separated from the finger member FG by heat exchange between the refrigerant having a temperature higher than the freezing point in the flow space SP and the ice made in the finger member FG, for example, heat transfer from the refrigerant having a temperature higher than the freezing point of the flow space SP to the ice made in the finger member FG.

Water may be sprayed onto the finger member FG by a water spray unit (not illustrated) to make ice 'I' in the finger member FG.

The refrigerant discharge pipe PD may be connected to the evaporation tube PE. As described above, the refrigerant discharge pipe PD may be connected to the connection hole HC formed in the plate member PL to serve as the evaporation tube PE.

The refrigerant, flowing through the refrigerant flow path FP of the evaporation tube PE and the finger member FG, for example, the flow space SP of the finger member FG, may be discharged through the refrigerant discharge pipe PD.

The refrigerant discharge pipe PD may be connected to a compressor included in the refrigeration cycle. Accordingly, the refrigerant, flowing through the refrigerant flow path FP of the evaporation tube PE and the flow space SP of the finger member FG to be introduced into the refrigerant discharge pipe PD, may flow through the refrigerant discharge pipe PD to be introduced into the compressor of the refrigeration cycle.

The evaporator (EV) for ice-making according to an example embodiment may further include a heater (HE).

The heater HE may be provided in the evaporation tube PE to separate ice, made in the finger member FG, from the finger member FG.

The heater insertion tube PI may penetrate through one surface of the evaporation tube PE such that at least a portion of the heater insertion tube PI is disposed on the refrigerant flow path FP. As described above, for example, the heater insertion tube PI may pass through the passage hole HT of the closing member CL, so that at least a portion of the heater insertion tube PI may be disposed on the refrigerant flow path FP of the evaporation tube PE. In this case, the heater insertion tube PI may extend from the refrigerant flow path FP to the vicinity of the closing member CL in which the passage hole HT is not formed, as illustrated in FIG. 8.

The heater HE may be inserted into the above-described heater insertion tube PI. However, the configuration in which the heater HE is provided in the evaporation tube (PE) is not limited, and any known configuration may be employed as long as the heater HE penetrates through one surface of the evaporation tube PE such that at least a portion of the heater HE is disposed on the refrigerant flow path FP of the evaporation tube PE.

As set forth above, when a method for manufacturing an evaporator for ice-making and an evaporator for ice-making according to an example embodiment are used, a finger member having a protrusion formed on an external circumferential surface may be inserted into a through-hole formed in a plate having a development shape of a pipe, and the protrusion may be caught on a portion of the plate member around the through-hole. Thus, at least a portion of the finger member may penetrate through the through-hole, finger members included in the evaporator for ice-making may be easily connected, and the evaporator for ice-making may be easily manufactured.

The method for manufacturing an evaporator for ice-making and an evaporator for ice-making described above are not limited to the features described in the example embodiments set forth herein, but overall or some of the example embodiments may be selectively combined and configured to implement a variety of modifications.

The invention claimed is:

1. A method for manufacturing an evaporator for ice-making, the method comprising:
   a preparation operation of preparing a plate member provided with a plurality of through-holes formed therein, and further providing a plurality of finger members and a capillary tube;
   an insertion operation of inserting each of the finger members into the through-holes such that at least a portion of each of the finger members penetrates through the through-holes;
   a connection operation of fixedly connecting the finger members to the plate member;
   an insert placement operation of placing at least a portion of the capillary tube on the plate member; and
   an evaporation tube forming operation of bending the plate member in a form of a pipe and connecting end portions of the plate member to form an evaporation tube in which a refrigerant flow path, through which a refrigerant flows, is formed.

2. The method of claim 1, wherein a protrusion is formed on an external circumferential surface of an upper end portion of each of the finger members to be caught on a portion of the plate member around the through-holes.

3. The method of claim 2, wherein in the connection operation, each of the finger members is fixedly connected to the plate member by laser welding.

4. The method of claim 3, wherein in the connection operation, laser is irradiated on a portion of the plate member around each of the through-holes with which the protrusion is in contact.

5. The method of claim 4, wherein in the connection operation, the laser is irradiated to be parallel to a virtual line parallel to a length direction of each of the finger members, or to be inclined to the virtual line at an angle of 15 degrees or less.

6. The method of claim 2, wherein in the insertion operation, a lower portion of each of the finger members is first inserted into the through-holes such that each of the finger members penetrates through the through-holes, and then the protrusion on the upper end portion of each of the finger members is caught on the portion of the plate member around the through-holes.

7. The method of claim 1, wherein a flow space having an open upper portion and a closed lower portion is formed in each of the finger members, a diaphragm member is further prepared in the preparation operation, and at least a portion of the diaphragm member is inserted into the flow space in the insertion operation.

8. The method of claim 7, wherein a passage hole is formed in a portion of the diaphragm member which is not inserted into the flow space and, in the insert placement operation, at least a portion of the capillary tube passes through the passage hole to be disposed on the plate member.

9. The method of claim 7, further comprising:
   a bonding material applying operation of applying a bonding material to a portion of the plate member to be in contact with the diaphragm member; and
   a bonding material curing operation of curing the bonding material.

10. The method of claim 1, wherein in the insert placement operation, a heater insertion tube or a heater is further placed on the plate member.

* * * * *